J. P. McCREADY.
SLEIGHING ATTACHMENT FOR CARRIAGES.
APPLICATION FILED FEB. 16, 1911.
1,003,934.
Patented Sept. 19, 1911.
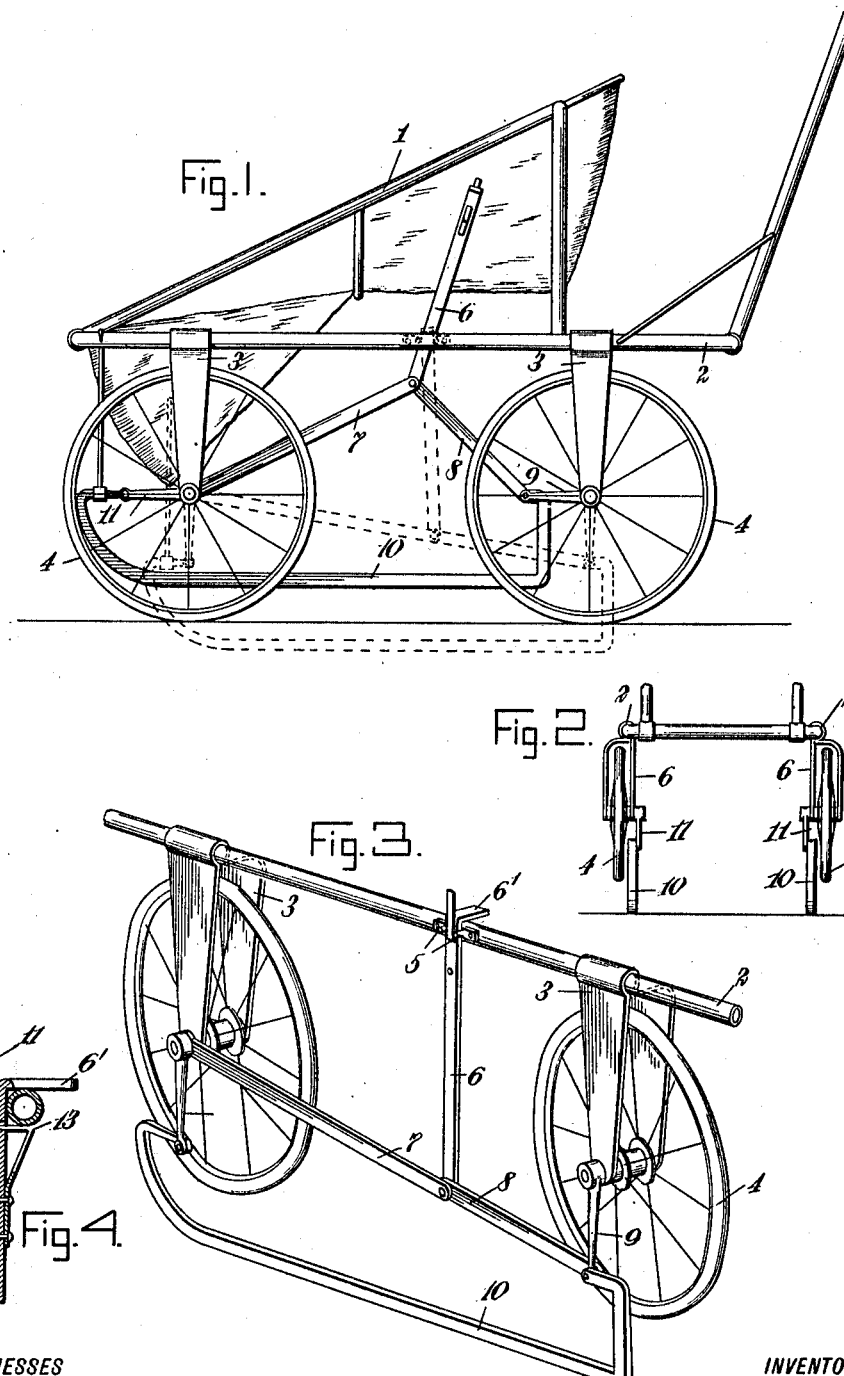
WITNESSES
INVENTOR
James P. McCready
BY
ATTORNEYS

UNITED STATES PATENT OFFICE.

JAMES P. McCREADY, OF BERLIN, NEW HAMPSHIRE.

SLEIGHING ATTACHMENT FOR CARRIAGES.

1,003,934. Specification of Letters Patent. Patented Sept. 19, 1911.

Application filed February 16, 1911. Serial No. 608,880.

*To all whom it may concern:*

Be it known that I, JAMES P. McCREADY, a citizen of the United States, and a resident of Berlin, in the county of Coos and State of New Hampshire, have invented a new and Improved Sleighing Attachment for Carriages, of which the following is a full, clear, and exact description.

My invention is a sleighing attachment for baby carriages, go-carts and vehicles in general, and it comprises a plurality of runners which can be suitably supported beneath the body of the vehicle and adjustably attached thereto, so that they can be raised clear of the ground when they are not needed for use, or lowered when desired to support the weight of the vehicle thereon.

Reference is to be had to the accompanying drawings forming a part of this specification, in which the same characters of reference indicate the same parts in all the views.

Figure 1 is a side view of a baby carriage or go-cart, showing my improved runners in raised position. The dotted lines indicate the positions which these runners assume when they are lowered and made ready for use; Fig. 2 is a front elevation of the forward part of the carriage, showing the runners lowered and the carriage wheels supported in position to clear the ground; Fig. 3 is a perspective view of one pair of side wheels for the carriage, showing the position which the wheels assume when the runner is lowered; and Fig. 4 is a vertical section taken through the top of the adjusting lever, showing the catch for engaging the side bar of the carriage when the lever is pushed down.

The carriage or go-cart is indicated as a whole by the numeral 1, and the framework thereof comprises side bars 2, to which are secured downward-extending braces 3, carrying in their lower ends the axles on the wheels 4, two of such braces 3 being arranged on each of the side bars 2, as shown. Each side bar 2 has a pair of lugs 5 made integral therewith or fastened in any suitable fashion thereon, projecting outward from its sides and serving as guides for a bar or lever 6. This bar or lever 6 is pivotally connected at its lower ends to a pair of links 7 and 8, the other end of the forward link 7 being pivotally attached to the axle of the front wheel of the carriage, and the other end of the rear link 8 being pivotally attached to an arm or link 9, pivotally connected to the rear wheel on that side of the carriage. The rear end of the runner 10 is pivotally mounted on the same bolt that serves to connect the adjacent ends of the links 8 and 9, and the front end of the runner is pivotally connected to a link 11, similar to the link 9, and pivotally joined at its other end to the axle of the front wheel of the carriage.

The bar 6 has a spring latch 11, fastened to its inside adjacent the upper end thereof, the said end being bent over, as shown at 6'. This latch 11 is bent outward away from the inner face of the rod 6, and then bent at right-angles to said face, passing through the aperture 12. On the outer side of the rod 6, this latch 11 is bent upward to a vertical position, and the part which is bent at a right-angle to the rod 6 forms a shoulder 13, which passes beneath the side bar 2 and forms a rest or support therefor. The bar 2 rests upon this supporting shoulder and is firmly held between the same and the bent-over end 6'.

When the runners are not needed the bar 6 is pulled up until it occupies the full-lined position shown on Fig. 1, raising the runners 10 to clear the ground. The carriage is then supported upon its side wheels and can be moved about in the ordinary way. In order to bring the sleighing attachment into use the bar 6 is simply pushed down between the lugs or projections 5, and in its downward movement it forces the links 7 and 8 downward. The link 8 in its downward movement causes the link 9, pivotally attached to the axle of the rear wheel, to rotate downward around the axle in an anticlockwise direction. This will lower the rear end of the runner 10, and as the distance between the points of pivotal attachment of the runner to the links 9 and 11, is constant, the link 9 as it rotates through a certain angle will pull the link 11 with it, causing the runner to rest firmly upon the ground over its whole length. When the bar 6 and the runners 10 are in their lowermost position the latch 11 will lock the links 7 and 8, and the weight of the carriage will be supported on the runners by means of the links attached to the ends of the runners and the axles of the wheels 4. The carriage is now transformed into a sleigh, but the sleighing attachment can be thrown out of action at any time simply by releasing the latch 11 and raising the bar 6.

Obviously, I use a similar runner on each side of the carriage in connection with each side bar 2, and the arrangement of the links and levers will be the same on both sides of the vehicle.

It will be observed that the link 7 is pivoted to the front axle, while the link 8 is pivoted to the link or arm 9. The rear link 8, therefore, is the operating link which forces the runner 10 on that side downward, the link 7 serving merely to guide the rod 6 and link 8 in their movements. As the rod 6 is pushed downward it gives a toggle-joint action on the links 7 and 8, thus raising the weight of the carriage and the contents with very little effort, until the same are supported upon the runners 10.

Having thus described my invention, I claim as new and desire to secure by Letters Patent:

1. A sleighing attachment for carriages and the like, comprising a runner, links for connecting the runner to the frame of the carriage, a toggle-joint connected at one end to the said frame and at its other end to one of said links, and a rod for operating said toggle-joint to depress the runner into operative position.

2. A sleighing attachment for carriages and the like, comprising a runner, links pivotally connected to the ends of said runner for attaching the same to the carriage frame, a toggle-joint pivoted at one end to the frame of the carriage and at its other end to one of said links, a rod for operating said toggle-joint to depress the runner into operative position, guides on the carriage frame for said rod, and a latch for locking the said rod to the frame of the carriage when the same is pushed down to depress the runner.

3. A sleighing attachment for a carriage, comprising a runner, links pivotally connecting the ends of said runner to the frame of the carriage, a toggle-joint pivotally connected at one end to the frame of the carriage and at the other end to one of said links, a rod connected to the said toggle-joint to operate the same, guides on the carriage frame for said rod, and a latch mounted on said rod for holding the same fast when it is pushed down to depress the runner, said links, when the runner is depressed, serving as supports for the carriage, to keep the carriage wheels above the level of the ground.

4. A sleighing attachment for carriages and the like, comprising a runner, links pivotally connected to the ends of said runner and to the axles of the carriage, a toggle joint pivoted at one end to one of said axles and at its other end to one of said links, a rod for operating said toggle joint to depress the runner into operative position, said rod being connected to said toggle joint, and means on the carriage frame for receiving and guiding said rod.

5. A sleighing attachment for carriages and the like, comprising a runner, means for pivotally connecting the runner to the carriage frame to permit the same to be raised and lowered, a toggle joint connected to said means and to said frame, and a rod for operating said toggle joint to depress the runner into operative position.

6. A sleighing attachment for carriages and the like, comprising a runner, means pivotally connected to the ends of the runner and to the frame of the carriage to attach the runner to the frame of the carriage, a link pivotally connected to the frame of the carriage at one end, another link pivotally connected at one end to the runner, and means pivotally connected to the free ends of said links for causing said runner to be raised and lowered into and out of operative position.

In testimony whereof I have signed my name to this specification in the presence of two subscribing witnesses.

JAMES P. McCREADY.

Witnesses:
H. G. NEYES,
THOMAS L. MARBLE.